C. E. ROBINSON, G. W. YOUNG & J. B. F. SHOWALTER.
TIRE.
APPLICATION FILED FEB. 25, 1915.
1,148,408.
Patented July 27, 1915.
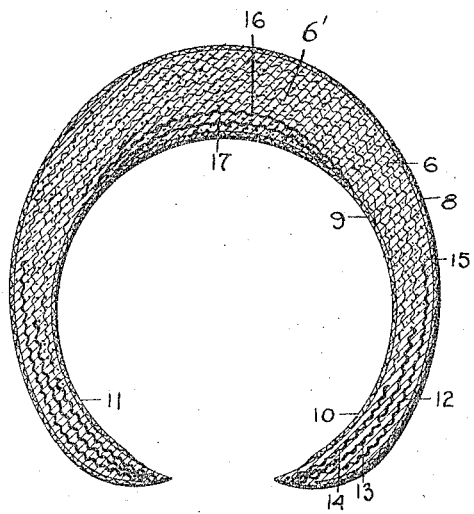
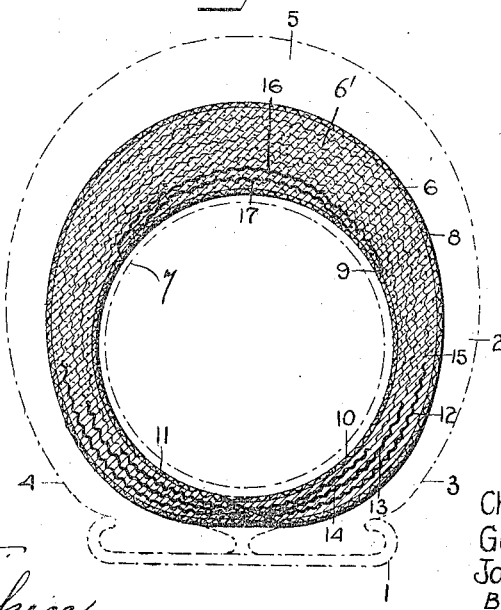
WITNESSES
H. J. Walker
A. L. Kitchin
INVENTORS
Chauncey E. Robinson
George W. Young
Jay B. F. Showalter
BY
ATTORNEYS

UNITED STATES PATENT OFFICE.

CHAUNCEY E. ROBINSON, GEORGE W. YOUNG, AND JAY B. F. SHOWALTER, OF SPRINGFIELD, MISSOURI.

TIRE.

1,148,408.

Specification of Letters Patent.

Patented July 27, 1915.

Application filed February 25, 1915. Serial No. 10,462.

*To all whom it may concern:*

Be it known that we, CHAUNCEY E. ROBINSON, GEORGE W. YOUNG, and JAY B. F. SHOWALTER, all citizens of the United States, and residents of Springfield, in the county of Greene and State of Missouri, have invented a new and Improved Tire, of which the following is a full, clear, and exact description.

This invention relates to improvements in tires, and particularly to an inner tire or sub-cushioning member, and has for an object the provision of an improved simple, strong and resilient structure adapted to prevent punctures and rim cutting.

Another object of the invention is to provide a substantially constructed lining device, or filling member which is arranged with bracing members opposite the bending point of the tire, and with a comparatively thick resilient cushion opposite the tread so as to brace one part of the tire and resiliently support another part of the tire while resisting puncturing.

In the accompanying drawings Figure 1 is a transverse section through a tire or filler embodying the invention, the same being open; Fig. 2 is a transverse section through a tire embodying the invention, an outer casing being shown in connection therewith.

In the construction of tires, various means have been provided for preventing puncturing, and various shapes of casing have been constructed for resisting puncturing, and resisting rim cutting. Usually the tire is prepared for a certain form of rim so as to obviate the ordinary rim cutting commonly experienced by persons using pneumatic tires. In addition to these means various fillers or auxiliary tires have been provided for preventing puncturing by reason of the extra thickness of material through which the puncturing article must pass before it can injure the inner tube. These extra layers are usually of such a character as to provide undesirable weight and cause the tire to be appreciably less resilient. These objectionable features often outweigh or overcome the desirable feature of making the tire puncture-proof. However, in none of these devices are there provided means for preventing puncturing and at the same time preventing rim cutting. In the present invention an inner tire or lining member is provided which prevents puncture by presenting a comparatively thick section of material adjacent the tread of the outer casing, and at the same time presenting comparatively stiff or rigid members adjacent the point usually rim-cut, namely, the usual bending line adjacent the rim on which the tire is positioned. By providing a stiffening member at this point the bending line is raised or moved radially outwardly, whereby the resilient effect of the tire is not injured but the outer casing is strengthened at a point where it is most liable to be injured.

In the accompanying drawings an embodiment of the invention is shown. Referring to the drawings by numerals 1 indicates a rim of the clencher type for receiving the outer casing or shoe 2 which may be of any desired construction. Ordinarily the inner tube can be placed in the outer casing of shoe 2 and inflated and the tire would then be in condition for use. However, it will be seen that when the tire is used as in the manner just described the weakest point is approximately at points 3 and 4 commonly known as the bending line, and where the tire rim cuts when not kept properly inflated. The tread 5 is also of the usual form, namely, an appreciable amount thicker and heavier than the sides so as to resist wear and puncture. However, the thickness of the tread of the outer casing is not sufficient for preventing many articles from puncturing the tire and the sides also are not of sufficient thickness to prevent puncture. If these sides were made thicker and of substantially the same material as the remaining portion of the sides, the tire would be undesirably heavy, and appreciably less resilient. In order to present a tire with substantially the usual resiliency and yet brace the bending lines 3 and 4 and reinforce the tread 5, a lining member 6 is provided which may be inserted and removed at any time, and which is adapted to snugly fit the inner casing when in use so that the ends of the lining member will overlap. The inner tube 7 is of course placed within the lining member 6 in order to receive the compressed air in the usual manner. The lining member 6 is formed with an outer member 8 of canvas or other suitable material and an inner member 9 of canvas or other suitable material. The filling between the members 8 and 9 is variously adjusted and formed of different substances in order to produce the results above mentioned. The sections of the lining member substantially opposite the points 10 and 11 are arranged to present a comparatively stiff though somewhat resilient structure in order to brace the weak bending lines 3 and 4. It will be observed that each of these lower portions is provided with layers of canvas 12, 13 and 14, the longest of which extends from near the center of the lining member, namely, point 15, and the others being formed in a stepped structure as shown in Fig. 2, so that the inner canvas strip 14 will be the shortest. It will be evident that a greater or less number of canvas strips could be used at this point, but this construction is to be followed in order to present a comparatively rigid structure near the lower end which merges more and more into a flexible structure until it is most flexible about point 15 where the lining member more easily bends, and to which point the bending line of the outer casing or shoe is moved. The lower edges of the filling member containing the strips 12, 13 and 14 are impregnated with rubber, and if desired thin layers of rubber may be arranged between these strips and vulcanized until the rubber is comparatively stiff.

From the upper end of the various strips 12, 13 and 14 on one side of the filler to similar strips on the opposite side is arranged a resilient body 6' formed so as to be light, resilient and comparatively strong. Various substances capable of stretching may be used for making the resilient body 6', as for instance layers of wool, wool fabric, or woolen compound impregnated with linings or fillings of rubber, which rubber is preferably of the porous type. Other materials may be used with the rubber, if desired, but the material used must be flexible so as to give resiliency, and also must be light and durable so that the filling member in its entirety will not add appreciably to the weight of the tire. In Fig. 1 of the drawing, it will be observed that the shortest strips of fabric, as for instance the layers of woolen or cotton fabric 17 are arranged centrally of the tread at the inner side thereof. The next layer 16 is superimposed on the first layer, and is somewhat longer. The third layer is longer than the second and so on until the entire body 6' has been filled up, the longest or outer layers of course extending to point 15, and in fact some of them extending to the upper ends of strips 13 and 14. These layers of fabric are impregnated with rubber, preferably of the porous kind, whereby a structure is presented which will be very light but which will resist puncture, and which will space the tread portion of the inner tube 7 an appreciable distance from the outer tread portion of the casing or shoe 2 without injuring to any considerable extent the resiliency of the tire as the same is allowed to bend freely and approximately in line with the point 15. It is to be noted that point 15 is an appreciable distance above the usual bending lines 3 and 4, and entirely out of the way of the rim so that there is no chance of rim cutting. It will also be noted that the shape of the filling member is such as to snugly fit the outer casing when the parts are assembled as shown in Fig. 2. This will prevent any creeping or movement of the filling member after the tire has been inflated. It is evident that the filling member may overlap as shown in Fig. 2 or the lower ends may merely approach each other.

What we claim is—

1. In a sub-cushioning member or lining device, a body formed with an inner and outer layer, a resilient filling structure arranged at the tread portion of the lining device, said lining member merging into thin sides which in turn merge into resilient but comparatively stiff bottom edges.

2. A cushioning or lining member for tires, comprising a body formed with a tread, sides extending from said tread, said sides being flexible, and bases merging into said sides, said bases being comparatively stiff at their lower edge and merging gradually into a flexible structure as the bases merge into the sides, said bases being adapted to be arranged adjacent the base of the tire and to reinforce the tire immediately above the base thereof, whereby the bending line of the tire is moved an appreciable distance away from the base of the tire.

3. In a device of the character described, a body provided with a pair of comparatively thin flexible sides, a tread portion of flexible material, said tread portion being comparatively thick, and a pair of bracing lower edges, said bracing lower edges being formed with a plurality of stiffening strips of canvas impregnated with rubber, the upper edge of said strips being formed stepshaped.

4. In a device of the character described, a body provided with flexible sides, a flexible tread portion and a pair of bracing lower side portions, each of said bracing lower side portions being formed from comparatively hard vulcanized rubber and layers of fabric, said layers of fabric and rubber falling short of the central line of the body, whereby the bending or flexible lines of the tire are moved an appreciable distance away from the rim face of the tire.

5. In a device of the character described, a body provided with comparatively stiff bases for bracing a tire near the usual bending line, flexible sides, and a tread formed from a plurality of layers of pliable material and a filler composed of porous resilient material, said tread being appreciably thicker than the sides.

6. In a device of the character described, a body provided with an outer and inner covering of fabric, a tread formed from porous rubber, and a fabric capable of being stretched, said tread merging into thin sides, said sides merging into inner edges or bases, said bases being provided with a plurality of layers of fabric extending up to said side members, the top of said layers being in stepped formation, whereby the layer on one side will be comparatively short and the layer on the opposite side will be comparatively long in cross section.

In testimony whereof we have signed our names to this specification in the presence of two subscribing witnesses.

CHAUNCEY E. ROBINSON.
GEORGE W. YOUNG.
JAY B. F. SHOWALTER.

Witnesses:
W. S. MILLER,
THOS. R. GIBSON.